(12) United States Patent　　(10) Patent No.: US 8,023,882 B2
Croy et al.　　(45) Date of Patent: Sep. 20, 2011

(54) PORTABLE AUDIENCE MEASUREMENT ARCHITECTURES AND METHODS FOR PORTABLE AUDIENCE MEASUREMENT

(75) Inventors: David J. Croy, Palm Harbor, FL (US); Arun Ramaswamy, Tampa, FL (US); Paul Mears, Safety Harbor, FL (US)

(73) Assignee: The Nielsen Company (US), LLC., Schaumburg, IL (US)

( * ) Notice: Subject to any disclaimer, the term of this patent is extended or adjusted under 35 U.S.C. 154(b) by 990 days.

(21) Appl. No.: 11/457,666

(22) Filed: Jul. 14, 2006

(65) Prior Publication Data

US 2007/0006250 A1　　Jan. 4, 2007

Related U.S. Application Data

(63) Continuation of application No. PCT/US2004/000818, filed on Jan. 14, 2004.

(51) Int. Cl.
*H04H 60/21* (2008.01)
(52) U.S. Cl. ............... 455/2.01; 725/9; 725/10; 725/11; 725/13
(58) Field of Classification Search ................. 455/2.01; 725/13, 9–11
See application file for complete search history.

(56) References Cited

U.S. PATENT DOCUMENTS

| | | | |
|---|---|---|---|
| 4,603,232 A | 7/1986 | Kurland et al. |
| 4,623,230 A | 11/1986 | Weinblatt |
| 4,718,106 A | 1/1988 | Weinblatt |
| 4,930,011 A | 5/1990 | Kiewit |
| 5,014,206 A | 5/1991 | Scribner et al. |
| 5,068,656 A | 11/1991 | Sutherland |
| 5,072,380 A | 12/1991 | Randelman et al. |
| 5,097,981 A | 3/1992 | Degasperi et al. |
| 5,133,081 A | 7/1992 | Mayo |
| 5,142,278 A | 8/1992 | Moallemi et al. |
| 5,309,174 A | 5/1994 | Minkus |
| 5,331,544 A | 7/1994 | Lu et al. |
| 5,382,970 A | 1/1995 | Kiefl |

(Continued)

FOREIGN PATENT DOCUMENTS

AU　　199731160 B2　　12/1997

(Continued)

OTHER PUBLICATIONS

Written Opinion of the International Searching Authority for the International application No. PCT/US04/000818, dated Mar. 25, 2005, 9 pages.

(Continued)

*Primary Examiner* — Dominic E Rego
(74) *Attorney, Agent, or Firm* — Hanley, Flight & Zimmerman LLC

(57) ABSTRACT

Portable audience measurement architectures and methods for portable audience measurement are disclosed. A disclosed system contains a plurality of portable measurement devices configured to collect audience measurement data from media devices, a plurality of data collection servers configured to collect audience measurement data from the plurality of portable measurement devices, and a central data processing server. A portable measurement device establishes a communication link with a data collection server in a peer-to-peer manner and transfers the collected audience measurement data to the data collection server. Because the portable measurement device is not dedicated to a particular local data collection server, the portable measurement device periodically or a periodically broadcasts a message attempting to find a data collection server with which to establish a communication link.

21 Claims, 4 Drawing Sheets

U.S. PATENT DOCUMENTS

| | | | |
|---|---|---|---|
| 5,394,461 A | 2/1995 | Garland | |
| 5,398,190 A | 3/1995 | Wortham | |
| 5,406,271 A | 4/1995 | Sonnendorfer et al. | |
| 5,410,724 A | 4/1995 | Worthy | |
| 5,432,841 A | 7/1995 | Rimer | |
| 5,481,294 A | 1/1996 | Thomas et al. | |
| 5,490,060 A | 2/1996 | Malec et al. | |
| 5,510,828 A | 4/1996 | Lutterbach et al. | |
| 5,557,268 A | 9/1996 | Hughes et al. | |
| 5,557,524 A | 9/1996 | Maki | |
| 5,592,181 A | 1/1997 | Cai et al. | |
| 5,636,245 A | 6/1997 | Ernst et al. | |
| 5,638,077 A | 6/1997 | Martin | |
| 5,644,723 A | 7/1997 | Deaton et al. | |
| 5,691,980 A | 11/1997 | Welles et al. | |
| 5,699,244 A | 12/1997 | Clark, Jr. et al. | |
| 5,710,884 A | 1/1998 | Dedrick | |
| 5,812,959 A | 9/1998 | Froeburg et al. | |
| 5,815,114 A | 9/1998 | Speasl et al. | |
| 5,825,283 A | 10/1998 | Camhi | |
| 5,826,164 A | 10/1998 | Weinblatt | |
| 5,848,129 A | 12/1998 | Baker | |
| 5,872,588 A | 2/1999 | Aras et al. | |
| 5,890,068 A | 3/1999 | Fattouche et al. | |
| 5,898,284 A | 4/1999 | Sasajima | |
| 5,901,171 A | 5/1999 | Kohli et al. | |
| 5,923,252 A | 7/1999 | Sizer et al. | |
| 5,952,958 A | 9/1999 | Speasl et al. | |
| 5,974,396 A | 10/1999 | Anderson et al. | |
| 5,984,182 A | 11/1999 | Murrah et al. | |
| 5,995,015 A | 11/1999 | DeTemple et al. | |
| 6,006,148 A | 12/1999 | Strong | |
| 6,035,177 A * | 3/2000 | Moses et al. | 725/22 |
| 6,041,280 A | 3/2000 | Kohli et al. | |
| 6,091,956 A | 7/2000 | Hollenberg | |
| 6,098,048 A | 8/2000 | Dashefsky et al. | |
| 6,125,325 A | 9/2000 | Kohli | |
| 6,236,937 B1 | 5/2001 | Kohli | |
| 6,246,948 B1 | 6/2001 | Thakker | |
| 6,252,522 B1 | 6/2001 | Hampton et al. | |
| 6,353,929 B1 | 3/2002 | Houston | |
| 6,393,046 B1 | 5/2002 | Kohli et al. | |
| 6,397,041 B1 | 5/2002 | Ballard et al. | |
| 6,400,753 B1 | 6/2002 | Kohli et al. | |
| 6,421,609 B2 | 7/2002 | Kohli | |
| 6,466,971 B1 | 10/2002 | Humpleman et al. | |
| 6,467,089 B1 | 10/2002 | Aust et al. | |
| 6,530,082 B1 | 3/2003 | Del Sesto et al. | |
| 6,531,982 B1 | 3/2003 | White et al. | |
| 6,546,419 B1 | 4/2003 | Humpleman et al. | |
| 6,574,558 B2 | 6/2003 | Kohli | |
| 6,615,130 B2 | 9/2003 | Myr | |
| 6,647,548 B1 | 11/2003 | Lu et al. | |
| 6,741,684 B2 | 5/2004 | Kaars | |
| 6,745,011 B1 | 6/2004 | Hendrickson et al. | |
| 6,934,508 B2 | 8/2005 | Ceresoli et al. | |
| 6,970,131 B2 | 11/2005 | Percy et al. | |
| 7,181,159 B2 | 2/2007 | Breen | |
| 7,277,692 B1 * | 10/2007 | Jones et al. | 455/412.1 |
| 2001/0037232 A1 | 11/2001 | Miller | |
| 2001/0049620 A1 | 12/2001 | Blasko | |
| 2002/0010919 A1 * | 1/2002 | Lu et al. | 725/18 |
| 2002/0056087 A1 * | 5/2002 | Berezowski et al. | 725/9 |
| 2002/0059218 A1 | 5/2002 | August et al. | |
| 2002/0129360 A1 | 9/2002 | Lee | |
| 2002/0133393 A1 | 9/2002 | Tatsumi et al. | |
| 2002/0133412 A1 | 9/2002 | Oliver et al. | |
| 2002/0138830 A1 * | 9/2002 | Nagaoka et al. | 725/14 |
| 2002/0178441 A1 * | 11/2002 | Hashimoto | 725/11 |
| 2003/0005433 A1 | 1/2003 | Janik et al. | |
| 2003/0018977 A1 | 1/2003 | McKenna | |
| 2003/0037333 A1 * | 2/2003 | Ghashghai et al. | 725/46 |
| 2003/0041141 A1 | 2/2003 | Abdelaziz et al. | |
| 2003/0115586 A1 * | 6/2003 | Lejouan et al. | 725/9 |
| 2003/0122708 A1 | 7/2003 | Percy et al. | |
| 2003/0177488 A1 * | 9/2003 | Smith et al. | 725/9 |
| 2004/0004737 A1 * | 1/2004 | Kahn et al. | 358/1.15 |
| 2004/0111738 A1 | 6/2004 | Gunzinger | |
| 2005/0035857 A1 | 2/2005 | Zhang et al. | |
| 2005/0039206 A1 * | 2/2005 | Opdycke | 725/35 |
| 2005/0054285 A1 * | 3/2005 | Mears et al. | 455/2.01 |
| 2005/0144632 A1 | 6/2005 | Mears et al. | |
| 2005/0204379 A1 | 9/2005 | Yamamori | |
| 2008/0005308 A1 * | 1/2008 | Ochiai et al. | 709/223 |

FOREIGN PATENT DOCUMENTS

| | | |
|---|---|---|
| CA | 2252903 | 4/1997 |
| CA | 2229238 | 8/1999 |
| EP | 0 731 339 | 3/1996 |
| EP | 1 209 483 A3 | 4/1997 |
| EP | 1 271 102 A3 | 4/1997 |
| EP | 1 026 847 A2 | 8/2000 |
| EP | 1 209 483 A2 | 5/2002 |
| EP | 0 895 599 B1 | 8/2002 |
| EP | 0 731 339 B1 | 11/2002 |
| EP | 1 271 102 A2 | 1/2003 |
| JP | 8249307 | 9/1996 |
| JP | 9081638 | 9/1997 |
| JP | 11345388 | 12/1999 |
| JP | 2000020548 | 1/2000 |
| JP | 2000020555 | 1/2000 |
| JP | 2000048070 | 2/2000 |
| JP | 2002344933 | 11/2002 |
| WO | 9904350 | 1/1999 |
| WO | 0003364 | 1/2000 |
| WO | WO03095945 | 11/2003 |
| WO | 2005057956 | 6/2005 |

OTHER PUBLICATIONS

International Search Report of the International Searching Authority for the International application No. PCT/US04/000818, dated Mar. 25, 2005, 4 pages.

International Preliminary Report on Patentability and Written Opinion for International application No. PCT/US04/000818, dated Aug. 3, 2006, 11 pages.

Japanese Patent Office, "Notice of Grounds for Rejection," issued in connection with Japanese Patent Application Serial No. 2001-579179, mailed on Oct. 20, 2009, with its English language translation (5 pages).

Canadian Intellectual Property Office, "Notification of a Requisition by the Examiner," issued in connection with Canadian Patent Application No. 2,407,474, on Sep. 8, 2009 (4 pages).

Robinson, Phillip, Global positioning helps keeps travelers on course, Knight Ridder/Tribune News Service, Jun. 1997, 3 pages.

International Trade Administration, Office of Telecommunications, Global Positioning System: Market Projections and Trends in the Newest Global Information Utility, Sep. 1998, 95 pages.

Definition of "advertise", 1998, Webster's II—New Riverside University Dictionary, 1988, 3 pages.

"Nielsen to Test Electronic Ratings for Outdoor Advertizing", Bizcommunity.Com, Oct. 9, 2002, 4 pgs, www.biz-community.com/Artide/198/19/1181.html.

Battelle Transportation Division, "Lexington Area Travel Data Collection Test", Final Report to Federal Highway Administration, Sep. 15, 1997, 92 pgs, www.fhwa.dot.gov/ohi.

Australian Patent Office, Search Report, Jul. 12, 2005, 4 pages.

* cited by examiner

PORTABLE AUDIENCE MEASUREMENT ARCHITECTURES AND METHODS FOR PORTABLE AUDIENCE MEASUREMENT

RELATED APPLICATIONS

This patent arises from a continuation of International Patent Application No. PCT/US2004/000818, entitled "PORTABLE AUDIENCE MEASUREMENT ARCHITECTURES AND METHODS FOR PORTABLE AUDIENCE MEASUREMENT" which was filed on Jan. 14, 2004. International Patent Application No. PCT/US2004/000818 is hereby incorporated by reference in its entirety.

TECHNICAL FIELD

The present disclosure pertains to audience measurement and, more particularly, to portable audience measurement architectures and methods for portable audience measurement.

BACKGROUND

Determining a size and demographics of a television viewing audience helps television program producers improve their television programming and determine a price to be charged for advertising that is broadcasted during such programming. In addition, accurate television viewing demographics allow advertisers to target audiences of a desired size and/or audiences comprising members having a set of common, desired characteristics (e.g., income level, lifestyles, interests, etc.).

In order to collect these demographics, an audience measurement company may enlist a number of television viewers (e.g., panelists) to cooperate in an audience measurement study for a predefined length of time. The viewing habits of these enlisted viewers, as well as demographic data about these enlisted viewers, are collected using automated and/or manual collection methods. The collected data is subsequently used to generate a variety of informational statistics related to television viewing audiences including, for example, audience sizes, audience demographics, audience preferences, the total number of hours of television viewing per household and/or per region, etc.

The configurations of audience measurement systems vary depending on the equipment used to receive, process, and display television signals in each home being monitored. For example, homes that receive cable television signals and/or satellite television signals typically include a set top box (STB) to receive television signals from a cable and/or a satellite television provider. Television systems configured in this manner are typically monitored using hardware, firmware, and/or software to interface with the STB to extract or to generate signal information therefrom. Such hardware, firmware, and/or software may be adapted to perform a variety of monitoring tasks including, for example, detecting the channel tuning status of a tuning device disposed in the STB, extracting program identification codes embedded in television signals tuned by the STB, generating signatures characteristic of television signals tuned by the STB, etc. The collected viewing and demographic data may then be transmitted to a data collection facility for processing.

Traditional audience measurement systems have employed a client/server architecture with the client (e.g., a metering device, measurement device, etc.) and server (e.g., a data collection unit to collect data from the metering device) being in fixed physical locations. For example, in a typical system, the client is located in a room in an enlisted viewer's residence and there may be a need for multiple clients if additional rooms in the enlisted viewer's residence are to be monitored. The server is typically located in an off-site location away from the enlisted viewer's residence. Also, each client is assigned to a specific data collection server so that, even in the case of a portable client (e.g., a metering device), data collected by the metering device is always exported to the same data collection server.

Typically, metering devices (e.g., a Peoplemeter) communicate with media devices (e.g., devices to be measured such as a TV, STB, etc.) to measure usage of the media devices. The metering devices accumulate the viewing and demographic data and typically use a proprietary data transfer protocol to communicate with a dedicated data collection unit. The proprietary data transfer protocol is non-extensible.

DETAILED DESCRIPTION

Figure 1:
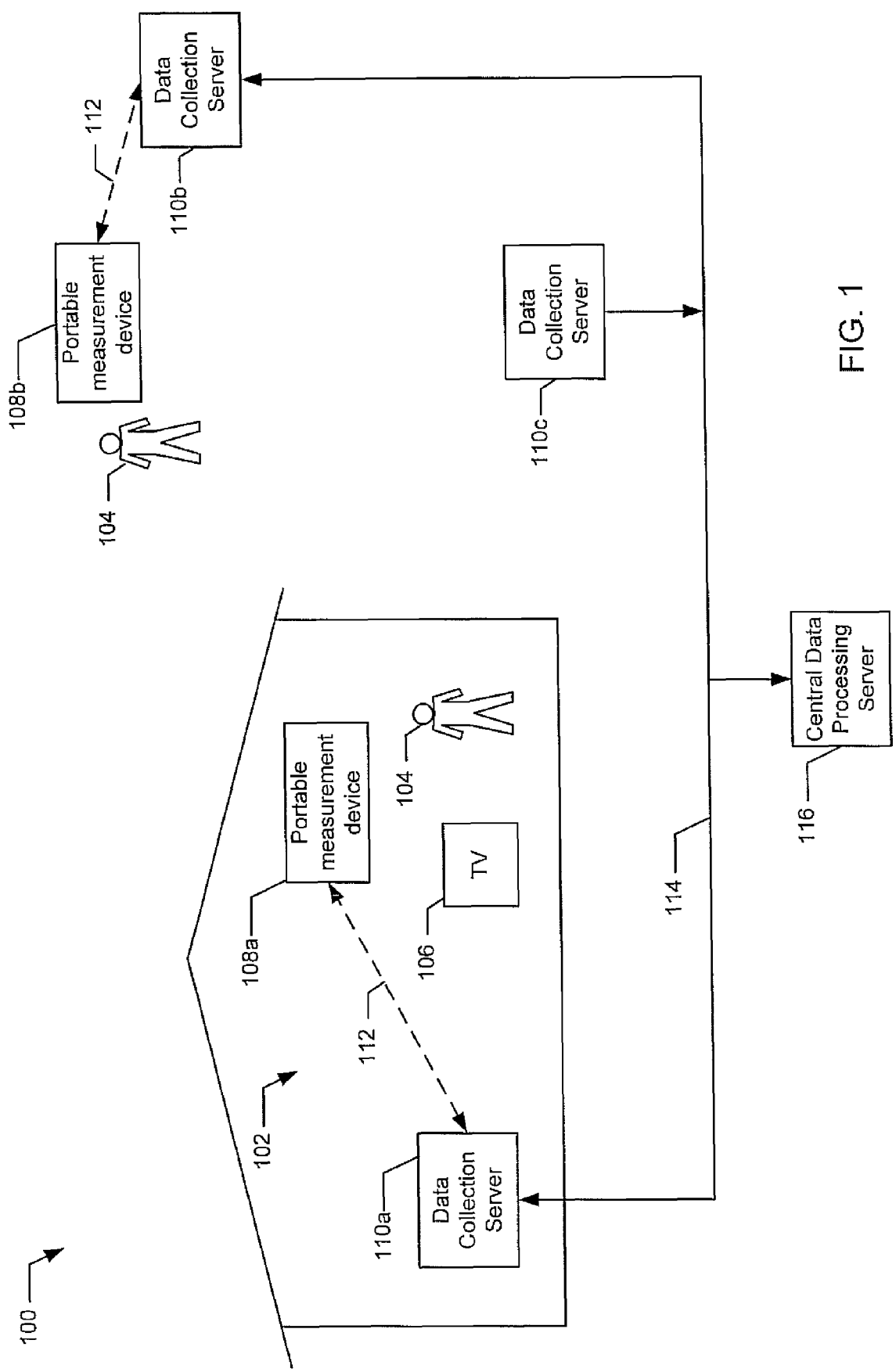
FIG. 1 is a block diagram of an example portable audience measurement system.

FIG. 1 is a block diagram of an example audience measurement architecture 100. The audience measurement architecture 100 comprises a viewing area 102, household members 104, a media device 106, portable measurement devices 108a and 108b, data collection servers 110a, 110b, and 110c, a communication protocol 112, a network connection 114, and a central data processing server 116.

The media device 106 may be any device that is to be measured by the audience measurement architecture disclosed herein. As described above, the media device 106 may be a television and/or an audio system, but may also include a STB, a video game console or system, advertisements, and/or a personal computer.

The viewing area 102, as shown in FIG. 1, is located within a house which may be occupied by one or more people, referred to as household members 104 (e.g. panelists). The viewing area 102 includes the area in which media devices (e.g., a television 106, a STB, a radio, etc.) are being monitored, is located. In the case of television audience monitoring shown in FIG. 1, the television 106 may be viewed by one or more household members 104 located in the viewing area 102. Although FIG. 1 illustrates the viewing area 102 within a house, because the metering devices 108a and 108b are portable, other viewing areas outside the house may also be monitored. For example, if the device to be monitored is an audio system in an automobile (e.g., a car stereo or compact disc (CD) player), a viewing area may be an automobile and the area surrounding the automobile. As another example, if the audience measurement system is collecting television audience statistics, viewing areas may include the areas around televisions outside the house (e.g., in a restaurant, in a bar, etc.) as well as the home viewing area 102.

The portable measurement devices 108a and 108b are devices to collect audience measurement data from media devices 106. Preferably, the portable measurement devices 108a and 108b are designed to be worn or otherwise carried by the household members 104. The portable measurement devices 108a and 108b may use well known techniques to collect the audience measurement data such as audio code capture techniques and/or audio signature capture techniques. The portable measurement devices 108a and 108b may also be configured to capture program identification code information or collect audience measurement data using any other method known to a person of ordinary skill in the art. The collected audience measuring data may be stored in any type of storage device 320 (FIG. 4) or main memory 310 (FIG. 4) or any other device to store the data.

The portable measurement devices 108a and 108b are also configured to have wireless communication capabilities using an extensible data transport protocol 112 such as Extensible Markup Language (XML) and may also have the capabilities of discovering other portable measurement devices 108 and/or data collection servers 110a, 110b, and/or 110c that are within a predetermined distance of the portable measurement devices 108a and 108b (e.g., a communication range). The wireless communication may be implemented using any wireless protocol such as Bluetooth, 802.11b, General Packet Radio Service (GPRS), Code Division Multiple Access (CDMA), etc.

The data collection servers 110a, 110b, and 110c may be any device configured to collect audience measurement data from any portable measurement device 108a or 108b from a plurality of portable measurement devices. The data collection servers 110a, 110b, and 110c are configured to communicate with any portable measurement device 108a or 108b from a plurality of portable measurement devices in a peer-to-peer manner using any wireless communication protocol and/or standard. The data collection servers 110a, 110b, and 110c may be located anywhere (e.g., in a viewing area 102, in a home, outside of a home, in a restaurant, in a bar, outside, on a telephone pole or a cellular phone tower, etc.) and are situated to receive and store the audience measurement data from the portable measuring devices 108a and 108b. The data collection servers 110a, 110b, and 110c are typically stationary servers configured to communicate with the central data processing server 116 and a plurality of portable measurement devices (e.g., portable measurement devices 108a and 108b). The geographical location and the communication range of each data collection server 110a, 110b, and 110c may be known by the central data processing server 116 and the geographical location/proximity of a portable measurement device 108a and/or 108b may be determined from the reporting data collection server's location. For example, if the central data processing server 116 receives data from data collection server 110a, it may determine that portable measurement device 108a has been in the geographical or network proximity of the data collection server 110a. When the portable measurement devices 108a and 108b are within the communication range of at least one of the data collection servers 110a, 110b, and 110c, a communication link (e.g., a network connection) is established via the communication protocol 112 and the portable measurement devices 108a and 108b may transmit audience measurement data to the data collection server 110a, 110b, and 110c. The data collection servers 110a, 110b, and 110c may process, store, and/or transmit the audience measurement data to the central data processing server 116 via the network connection 114. The data collection servers 110a, 110b, and 110c may also be configured to detect the portable measurement devices 108a and 108b and indicate the data collection servers' ability to receive audience measurement data.

Figure 2:
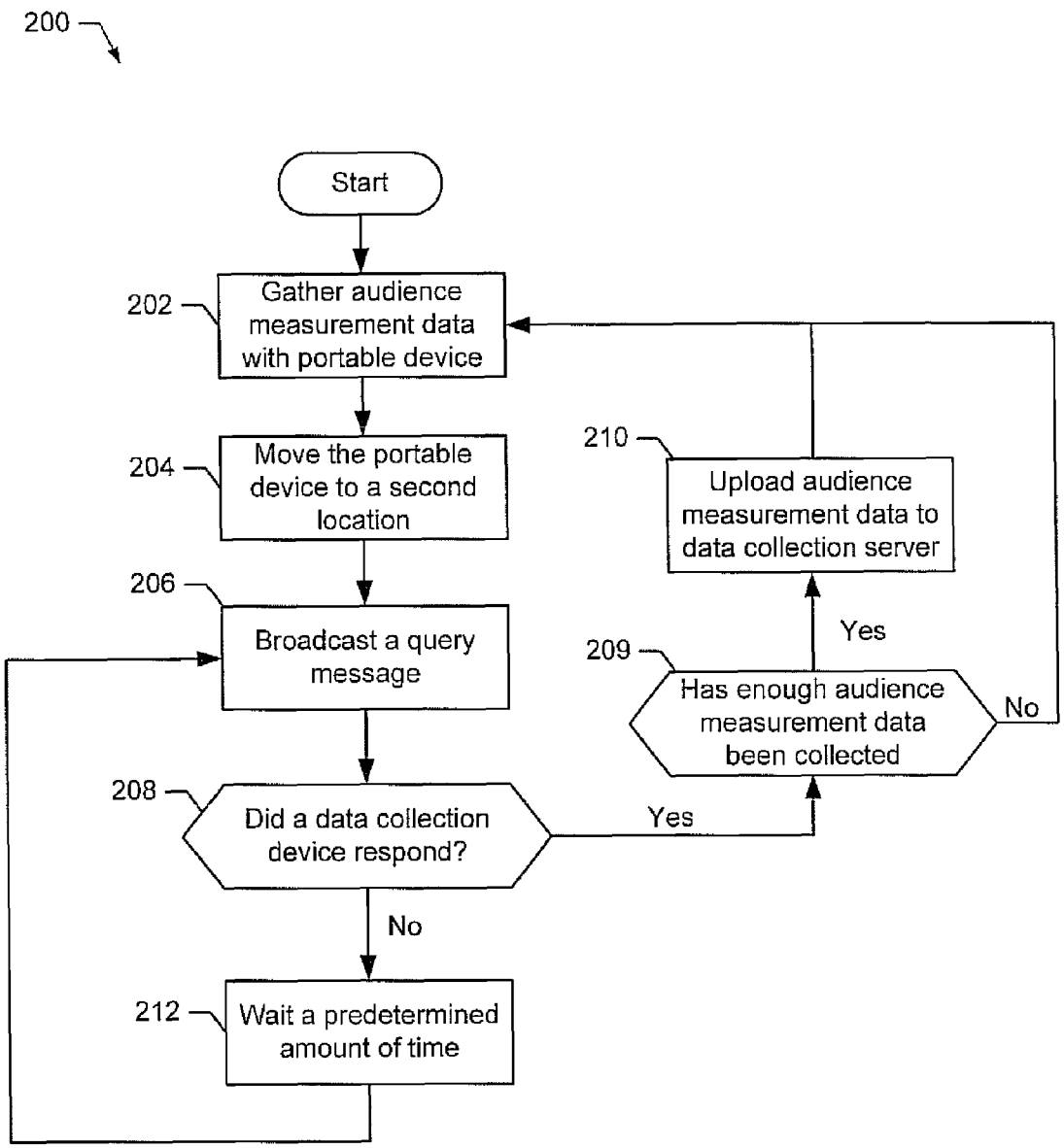
FIG. 2 is a flowchart representative of example machine readable instructions to implement the example portable measurement device in the portable audience measurement system.

The portable measurement devices 108a and 108b may detect the data collection servers 110 (e.g., the data collection servers 110a, 110b, 110c, and/or other data collection servers not shown in FIG. 2) and/or other portable measurement devices 108 by broadcasting a query message. The query message may identify and/or publish the portable measurement device's capabilities such as the communication protocol 112, the ability to collect and/or receive audience measurement data, and/or the ability to transfer audience measurement data. Alternatively, the query message may be a message probing a local network for data collection servers 110 and/or searching for a network to join. Although the portable measurement devices 108a and 108b are able to communicate with any data collection server 110a, 110b, or 110c, each portable measurement device 108a or 108b is associated with a viewing area 102, a data collection server 110a, 110b, or 110c in the home of the household members 104 or located elsewhere, and/or household members 104.

The communication protocol 112 may be any extensible data transport protocol such as XML and/or XML Web Services. In the illustrated example, the communication protocol 112 is a non-proprietary protocol that allows devices such as the data collection servers 110a, 110b, and 110c and the portable measurement devices 108a and 108b to communicate with one another in a global or localized manner (e.g. a peer-to-peer network). The communication protocol 112 may be implemented via a wireless network protocol such as Bluetooth, 802.11b and/or an infrared (IR) connection.

The network connection 114 may be implemented using any type of public or private network such as, but not limited to, the Internet, an intranet, a telephone network, a local area network (LAN), a cable network, and/or a wireless peer-to-peer network. The network connection 114 allows for the data collection servers 110a, 110b, and 110c to communicate with one another, with the central data processing server 116 and/or with other devices which may be connected through the network connection 114 such as a personal computer.

The central data processing server 116 is a device that collects audience measurement data from the data collection servers 110a, 110b, and 110c via the network connection 114. The central data processing server 116 may store and/or process the data received from the data collection servers 110a, 110b, and 110c. Typically, the central data processing server 116 processes the received data into reports that may be sold to interested parties.

A typical scenario in which a portable measurement device 108a or 108b is used may be similar to the following example. In this example, it is assumed that the viewing area 102 is a room in a house, including a television 106, and the portable measurement device 108a is associated with the viewing area 102. It is also assumed the portable measurement device 108a is configured to collect audience measurement data from the television 106.

The household member 104 watching the television 106 places the portable measurement device 108a in the viewing area 102. The portable measurement device 108a collects signatures of television programs and/or advertisements shown on the television 106 and/or codes broadcast with the television program and/or advertisements. Subsequently, the household member 104, may move the portable measurement device 108a to a first location outside of the viewing area 102 such as a second room in the house containing a data collection server 110a. If so, the portable measurement device 108a may detect the data collection server 110a and may determine that enough audience measurement data has been collected. If so, it uploads the audience measurement data to the data collection server 110*a*. The data collection server 110*a* may communicate with the portable measurement device 108*a* when the portable measurement device 108*a* is present in the house (irrespective of which room) and within the communication range of the data collection server 110*a*. This may be implemented by a wireless network in the house which is well known to those of ordinary skill in the art. The data collection server 110*a* may be able to use a signal strength from the portable measurement device 108*a* to determine where in the house the portable measurement device 108*a* is located.

Subsequently, the household member 104 may carry the portable measurement device 108*a* back to the viewing area 102. The portable measurement device 108*a* then collects additional audience measurement data from the television 106. The household member 104 may then carry the portable measurement device 108*a* to a second location outside of the viewing area 102, such as a grocery store. If the second location (or a location between the first and second location (e.g., a telephone pole on the street or in a parking lot) contains a data collection server 110*b*, the portable measurement device 108*a* may detect the data collection server 110*b* and upload the audience measurement data to the data collection server 110*b* if a predetermined amount of audience measurement data has been collected.

Figure 3:
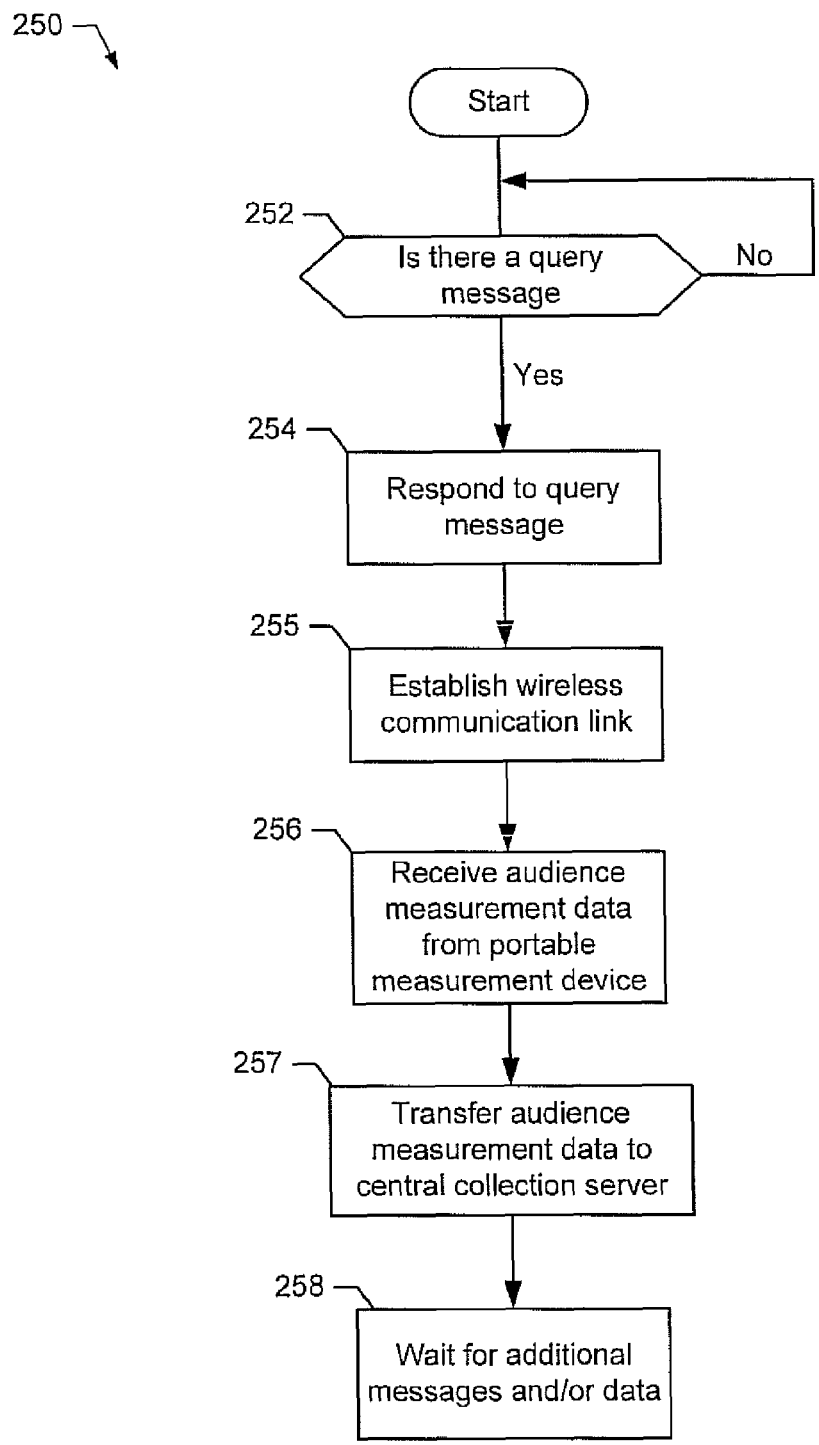
FIG. 3 is a flowchart representative of example machine readable instructions to implement a data collection server in the example portable audience measurement system.

FIGS. 2 and 3 are flowcharts representative of example machine readable instructions which may be executed by a portable measurement device 108 to implement an example method of audience measurement. Preferably, the illustrated processes 200 and 250 are embodied in one or more software or firmware programs which are stored in one or more memories (e.g., flash memory 312 and/or hard disk 320) and executed by one or more processors (e.g., processor 306) in a well known manner. However, some or all of the blocks of the processes 200 and 250 may be performed manually and/or by some other device. Although the processes 200 and 250 are described with reference to the flowchart illustrated in FIGS. 2 and 3, a person of ordinary skill in the art will readily appreciate that many other methods of performing the processes 200 and 250 may be used. For example, the order of many of the blocks may be altered, the operation of one or more blocks may be changed, blocks may be combined, and/or blocks may be eliminated.

In general, the example process 200 begins when a portable measurement device 108 (e.g., the portable measurement devices 108*a* and/or 108*b* of FIG. 2 or other portable measurement devices not shown) collects audience measurement data from a media device 106. Subsequently, the portable measurement device 108 attempts to detect a data collection server 110. If the portable measurement device 108 detects a data collection server 110 and a predetermined amount of audience measurement data has been collected, the audience measurement data stored in the portable measurement device 108 is uploaded to the data collection server 110. Otherwise, the portable measurement device 108 waits a predetermined amount of time and then attempts to detect a data collection server 110. In this way, the portable measurement device 108 is able to export its collected data to any of several data collection servers 110*a*, 110*b*, and 110*c* as the portable measurement device 108 is transported from place to place.

More specifically, the process 200 of FIG. 2 begins when a portable measurement device 108*a* gathers audience measurement data (block 202). The portable measurement device 108*a* may collect audience measurement data from any type of media device 106, such as a television, a radio, billboards broadcasting an identifier and a map correlating the user's position to a known advertisement location such as billboard advertisements, and/or a personal computer. Examples of the audience measurement data to be collected, may include, but is not limited to signatures of a broadcast program (e.g., radio and/or television programming and/or advertisements), identification codes within the broadcast program (e.g., watermarked data in radio and/or television broadcasts and/or digital codes embedded within video frames of a program or advertisement), and/or channel tuning information. The audience measurement data may also include survey or prompt information. Methods to collect the audience measurement data are well known in the art and, thus, will not be described here.

After the audience measurement data has been collected by the portable measurement device 108*a*, a household member 104 may carry the portable measurement device 108*a* or the portable measurement device 108*a* may be otherwise moved to a new location (e.g., outside the home, into a separate room, etc.) (block 204). In the example of FIG. 1, a data collection server 110*a* is located in the home of the audience member 104 associated with the portable measurement device 108*a*. Therefore, when the portable measurement device 108 is moved a sufficient distance, it will move beyond the communication range of the server 110*a*. As a result of the portable measurement device 108*a* being outside the communication range of the data collection server 110*a*, a wireless communication link (e.g., a network connection using the communication protocol 112) between the data collection server 110*a* and the portable measurement device 108*a* is lost. Persons of ordinary skill in the art will appreciate, however, that there may not be a data collection server 110*a* located in the home or the viewing area 102.

Irrespective of the location of the server 110*a*, when the portable measurement device 108*a* detects the lost communication link 112, it attempts to establish a wireless communication link (e.g., discovered) with any available data collection server 110*a* by broadcasting a query message (block 206). The data collection server 110*a* may be discovered through commonly known protocols and/or the network identity of the collection servers 110*a* (e.g., a domain name and/or an Internet protocol address) may be stored in the portable measurement device 108*a*. The query message is transmitted using a communication protocol 112 as described above. The query message may be a message publishing the portable measurement device's capabilities (e.g., a wireless communication protocol, collecting audience measurement data, ability to transfer the collected audience measurement data, etc.) or a message searching for a network to join.

If a data collection server 110*a*, 110*b*, and 110*c* is in the communication range of the portable measurement device 108*a* and receives the query message, the data collection server 110*a*, 110*b*, and 110*c* responds and a wireless communication link is established between the data collection server 110*a*, 110*b*, and 110*c* and the portable measurement device 108*a* (block 208). The portable measurement device 108*a* then transfers the collected audience measurement data to the data collection server 110*a*, 110*b*, and 110*c* (block 210) using the communication protocol 112. Control then returns to block 210.

Although not shown in FIG. 2, after the collected audience measurement data is transferred to the data collection server 110*a*, 110*b*, and 110*c* (block 210), the data collection server 110*a*, 110*b*, and 110*c* may transfer the collected audience measurement data to a central collection server 116 and explained below in connection with FIG. 3.

Returning to block 208, if no data collection server 110 responds to the query message (block 208), the portable measurement device 108*a* waits a predetermined amount of time (block 212). The predetermined amount of time may be dynamically adjusted, set by a user, or determined in software. After the predetermined amount of time has elapsed (block 212), control returns to block 206 and the portable measurement device 108a again attempts to find a data collection server 110 by broadcasting the query message. This attempt may be successful if, for example, the device 108a has been moved to a location within the communication range of a data collection server 110a, 110b, and/or 110c.

FIG. 3 represents a program that may be executed by a data collection server 110a, 110b, or 110c. In general, the example process 250 of FIG. 3 begins by the data collection server 110a, 110b, or 110c searching for a query message broadcast by a portable measurement device 108a or 108b. If a query message is detected, the data collection server 110a, 110b, or 110c acknowledges the query message and establishes a wireless communication link with the portable measurement device 108a and/or 108b that broadcast the query message to publish its ability to receive an audience measurement data upload. After a wireless communication link is established, the data collection server 110a, 110b, or 110c receives audience measurement data from the portable measurement device 108a or 108b. The data collection server 110a, 110b, or 110c then waits for additional query messages and/or audience measurement data from the portable measurement device 108a and/or 108b and/or processes or transfers the audience measurement data that has been already received.

More specifically, the process of FIG. 3 begins when a data collection server 110a, 110b, or 110c searches for a query message broadcast from a portable measurement device 108a or 108b (block 252). If no query message is detected (block 252), control returns to block 252 and the data collection server 110a, 110b, or 110c continues to search for a query message.

If a query message is detected (block 252), the data collection server 110a, 110b, or 110c responds to the query message (block 254) and creates a wireless communication link with the portable measurement device 108a or 108b (block 255). The data collection server 110a, 110b, or 110c may respond to the query message by sending an acknowledgement message or some other message to inform the portable measurement device 108a or 108b of the presence and capabilities of the data collection server 110a, 110b, or 110c. The acknowledgment message is transmitted using the communication protocol 112 as described above.

After the wireless communication link is established (block 255), the data collection server 110a, 110b, or 110c collects audience measurement data from the portable measurement device 108a or 108b (block 256). The audience measurement data is transmitted from the portable measurement device 108a or 108b using the communication protocol 112.

After the audience measurement data is received by the data collection server 110a, 110b, or 110c (block 256), the data collection server 110a, 110b, or 110c may transfer the collected audience measurement data to the central data processing server 116 (block 257). The collected audience measurement data may be transferred as it is received by the data collection server 110a, 110b, or 110c or may be stored and transferred at a later time. The data collection server 110a, 110b, or 110c then waits for another query message and/or additional audience measurement data from the portable measurement device 108a or 108b (block 258).

Although the above examples illustrate only two portable measurement devices 108a and 108b, persons of ordinary skill in the art will readily appreciate that any number of portable measurement devices may be employed. Similarly, although only portable measurement devices 108a and 108b are discussed above, persons of ordinary skill in the art will appreciated that the system 100 may employ fixed measurement devices (not shown) in addition to the portable measurement devices. Moreover, although only three data collection servers 110a, 110b, and 110c are shown in the above example, a person of ordinary skill in the art will appreciate that any number of such servers may be employed. For example, additional data collection servers may be used in areas with large data traffic loads. Similarly, although only data collection servers 110a, 110b, or 110c employing an extensible language are disclosed above, persons of ordinary skill in the art will appreciate that some of the servers may be traditional dedicated servers adapted to collect data from fixed or otherwise dedicated metering devices.

Figure 4:
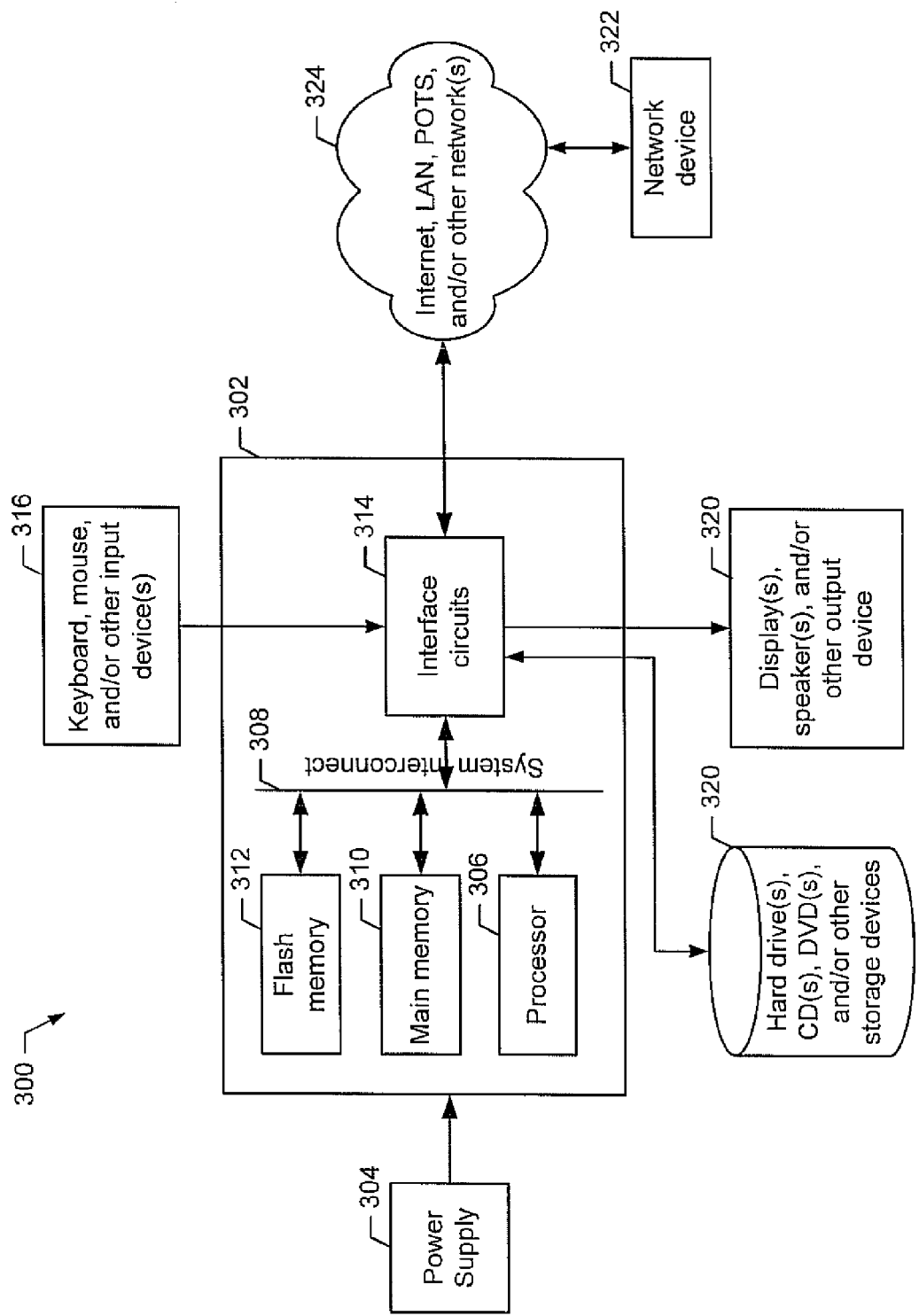
FIG. 4 is a block diagram of an example computer system that may execute the machine readable instructions represented by the flowcharts of FIG. 2 to implement the portable audience measurement device of FIG. 1.

FIG. 4 is a block diagram of an example processor system 300 that may be used to implement the methods and architecture for the disclosed portable measurement device 108a and 108b. The example processor system 300 may be similar to a personal computer (PC), a handheld computer, or any other computing device. In the illustrated example, the example processor system 300 includes a main processing unit 302 powered by a power supply 304. The main processing unit 302 may include a processor 306 electrically coupled by a system interconnect 308 to a main memory device 310, a flash memory device 312, and one or more interface circuits 314. The system interconnect 308 may be an address/data bus. Of course, a person of ordinary skill in the art will readily appreciate that interconnects other than busses may be used to connect the processor 306 to the other devices 310, 312, and 314. For example, one or more dedicated lines and/or a crossbar may be used to connect the processor 306 to the other devices 310, 312, and 314.

The processor 306 may be any type of well known processor, such as a processor from the Intel Pentium® family of microprocessors, the Intel Itanium® family of microprocessors, the Intel Centrino® family of microprocessors, and/or the Intel XScale® family of microprocessors. In addition, the processor 306 may include any type of well known cache memory, such as static random access memory (SRAM). The main memory device 310 may include dynamic random access memory (DRAM) and/or any other form of random access memory. For example, the main memory device 310 may include double data rate random access memory (DDRAM). The main memory device 310 may also include non-volatile memory. In an example, the main memory device 310 stores a software program which is executed by the processor 306 in a well known manner. The flash memory device 312 may be any type of flash memory device. The flash memory device 312 may store firmware used to boot the portable measurement device 300.

The interface circuit(s) 314 may be implemented using any type of well known interface standard, such as an Ethernet interface and/or a Universal Serial Bus (USB) interface. One or more input devices 316 may be connected to the interface circuits 314 for entering data and commands into the main processing unit 302. For example, the input device 316 may be a keypad, mouse, touch screen, track pad, track ball, and/or a voice recognition system.

One or more displays, speakers, and/or other output devices 318 may also be connected to the main processing unit 302 via one or more of the interface circuits 314. The display 318 may be a liquid crystal displays (LCD), light emitting diode (LED) display, or any other type of display. The display 318 may generate visual indications of data generated during operation of the main processing unit 302. The visual indications may include prompts for human operator input, calculated values, detected data, etc.

The example processor system 300 may also include one or more storage devices 320. For example, the portable measurement device 300 may include one or more hard drives, a compact disk (CD) drive, a digital versatile disk drive (DVD), and/or other computer media input/output (I/O) devices.

The example processor system 300 may also exchange data with other devices 322 via a connection to a network 324. The network connection may be any type of network connection, such as an Ethernet connection, a wireless network connection, a cellular data line, etc. The network 324 may be any type of network, such as the Internet, a cellular network, a cable network, and/or a wireless peer-to-peer network. Data may be exchanged using an extensible data transport such as XML and/or XML Web Services or may be exchanged using some other known communication protocol.

Because the hardware configuration of a server is well known, it is not separately shown. However, persons of ordinary skill in the art will appreciate that the data collection servers 110 may be implemented using hardware such as that shown in FIG. 4. Typically, the hardware of the server 110 will be more robust than the hardware of the portable data collection device 108, because the servers 110 do not face the portability constraints of the portable devices 108.

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatus, methods and articles of manufacture fairly falling within the scope of the appended claims either literally or under the doctrine of equivalents.

What is claimed is:

1. An audience measurement architecture comprising:
 a plurality of portable measurement devices, each of the portable measurement devices being structured to collect audience measurement data;
 a first data collection server at a panelist site to collect audience measurement data from a first one of the plurality of portable measurement devices; and
 a plurality of data collection servers respectively located at a plurality of locations to collect audience measurement data from any of the plurality of portable measurement devices, the first portable measurement device to automatically detect a second data collection server in the plurality of data collection servers and to transmit collected audience measurement data to the second data collection server via at least one of a WiFi connection or a Bluetooth connection when the first portable measurement device is located at the location of the second data collection server, a second portable measurement device of the plurality of portable measurement devices to automatically detect the second data collection server and to transmit collected audience measurement data to the second data collection server via at least one of a WiFi connection or a Bluetooth connection when the second portable measurement device is located at the location of the second data collection server.

2. An audience measurement architecture as defined in claim 1 wherein the plurality of portable measurement devices are not associated with the first data collection server or the second data collection server.

3. An audience measurement architecture as defined in claim 1 wherein the first data collection server and the second data collection server are networked with a central data processing server.

4. An audience measurement architecture as defined in claim 1 wherein the first data collection server and the second data collection server are structured to publish their capabilities to receive audience measurement data.

5. An audience measurement architecture as defined in claim 1 wherein the plurality of portable measurement devices are structured to publish their capability to upload audience measurement data.

6. An audience measurement architecture as defined in claim 1 wherein the plurality of portable measurement devices are structured to upload the audience measurement data whenever one of the first and second data collection servers are detected.

7. An audience measurement architecture as defined in claim 6 wherein the plurality of portable measurement devices upload the audience measurement data to one of the first and second data collection servers via a wireless connection.

8. An audience measurement architecture as defined in claim 1 wherein the plurality of portable measurement devices are structured to upload the audience measurement data after the plurality of portable measurement devices have collected a predetermined amount of audience measurement data and at least one of the first and second data collection servers are detected.

9. An audience measurement architecture as defined in claim 1 wherein the audience measurement data comprises at least one of a signature of a broadcast program detected by the first portable measurement device and a code broadcast with the broadcast program detected by the portable measurement device.

10. An audience measurement architecture as defined in claim 1 wherein at least one of the plurality of portable measurement devices is associated with a fixed data collection device when it is located in a predetermined location.

11. An audience measurement architecture as defined in claim 10 wherein the predetermined location is a home of a panelist.

12. An audience measurement architecture as defined in claim 1, wherein the first portable measurement device is to transmit the collected audience measurement data to at least one of the first data collection server and the second data collection server using extensible markup language messages.

13. An audience measurement architecture as defined in claim 1, wherein the plurality of locations are associated with one or more households and the second location is associated with a third party.

14. A method of collecting audience measurement data comprising:
 gathering audience measurement data using a first portable audience measurement device at a household;
 transporting the portable audience measurement device to a second location different from and outside the household;
 detecting, with the portable audience measurement device, availability of a first data collection server to collect audience measurement data at the household;

uploading the collected audience measurement data to the first data collection server;

transporting the portable audience measurement device to a third location different than the household and different than the second location;

detecting, with the portable audience measurement device, availability of a second data collection server to collect audience measurement data at the third location; and uploading the collected audience measurement data to the second data collection server via at least one of a WiFi connection or a Bluetooth connection.

15. A method as defined in claim 14 wherein the second location is a business.

16. A method as defined in claim 15 wherein the third location is a public area.

17. A method as defined in claim 14 wherein the first data collection server is not the second data collection server.

18. A method as defined in claim 14 wherein uploading the collected audience measurement data comprises transferring the collected audience measurement data via a wireless connection.

19. A method as defined in claim 14 wherein the first data collection server, the second data collection server, and the portable measurement device operate in accordance with an extensible data transport protocol.

20. A method as defined in claim 14 further comprising gathering audience measurement data at a further location; and uploading the audience measurement data gathered at the fourth location to one of the first and second data collection servers.

21. A method as defined in claim 14 wherein the first and second data collection servers and the portable audience measurement device have wireless communication capabilities.

* * * * *